US012774256B2

(12) United States Patent
Singlard et al.

(10) Patent No.: US 12,774,256 B2
(45) Date of Patent: Oct. 27, 2026

(54) METHOD FOR PRODUCING A CERAMIC MATRIX COMPOSITE PART

(71) Applicants: SAFRAN CERAMICS, Le Haillan (FR); IRT ANTOINE DE SAINT EXUPERY, Toulouse (FR); UNIVERSITE DE LIMOGES, Limoges (FR); CENTRE NATIONAL DE LA RECHERCHE SCIENTIFIQUE, Paris (FR)

(72) Inventors: Marc Singlard, Castres (FR); Gautier Mecuson, Moissy-Cramayel (FR); Anne Aimable, Limoges (FR); Cécile Pagnoux, Couzeix (FR); Aude Paillassa, Bordeaux (FR)

(73) Assignees: SAFRAN CERAMICS, Le Haillan (FR); IRT ANTOINE DE SAINT EXUPERY, Toulouse (FR); UNIVERSITE DE LIMOGES, Limoges (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 702 days.

(21) Appl. No.: 18/254,297

(22) PCT Filed: Nov. 10, 2021

(86) PCT No.: PCT/FR2021/051996

§ 371 (c)(1),
(2) Date: May 24, 2023

(87) PCT Pub. No.: WO2022/112681

PCT Pub. Date: Jun. 2, 2022

(65) Prior Publication Data

US 2024/0018057 A1 Jan. 18, 2024

(30) Foreign Application Priority Data

Nov. 26, 2020 (FR) .................................... 2012178

(51) Int. Cl.
*C04B 35/80* (2006.01)
*C04B 41/00* (2006.01)

(52) U.S. Cl.
CPC .......... *C04B 35/80* (2013.01); *C04B 41/0072* (2013.01); *C04B 2235/48* (2013.01); *C04B 2235/5256* (2013.01)

(58) Field of Classification Search
CPC . C04B 35/80; C04B 41/0072; C04B 2235/48; C04B 2235/5256
(Continued)

(56) References Cited

U.S. PATENT DOCUMENTS

2014/0200130 A1 7/2014 Szweda et al.
2016/0159702 A1* 6/2016 Lazur .................... C04B 35/565 427/249.15
(Continued)

FOREIGN PATENT DOCUMENTS

WO WO 2018/142080 A1 8/2018
WO WO 2019/081846 A1 5/2019
(Continued)

OTHER PUBLICATIONS

International Search Report as issued in International Patent Application No. PCT/FR2021/051996, dated Feb. 14, 2022.

*Primary Examiner* — Christina A Johnson
*Assistant Examiner* — Xue H Liu
(74) *Attorney, Agent, or Firm* — CUSHMAN PARTNERS LLC

(57) ABSTRACT

A method for producing a ceramic matrix composite part, includes forming a fiber preform from a plurality of fibrous structures including core-shell particles, the core-shell par-
(Continued)

ticles including a core portion formed by a core of ceramic material and a shell formed by an adhesive layer, the adhesive defining an outer surface of the core-shell particles and completely coating the core of ceramic material, and sintering the core-shell particles in the fiber preform obtained in order to form the ceramic matrix in the porosity thereof.

17 Claims, 2 Drawing Sheets

(58) Field of Classification Search
USPC .......................................................... 264/128
See application file for complete search history.

(56) References Cited

U.S. PATENT DOCUMENTS

| | | | | |
|---|---|---|---|---|
| 2017/0189960 | A1 | 7/2017 | Ibe | |
| 2020/0338840 | A1 * | 10/2020 | Schwartz | B28B 23/02 |
| 2023/0203217 | A1 * | 6/2023 | Delgado | C08F 220/14<br>526/348.2 |

FOREIGN PATENT DOCUMENTS

| | | | |
|---|---|---|---|
| WO | WO 2019/122758 | A1 | 6/2019 |
| WO | WO 2020/157632 | A1 | 8/2020 |

* cited by examiner

[Fig. 1]
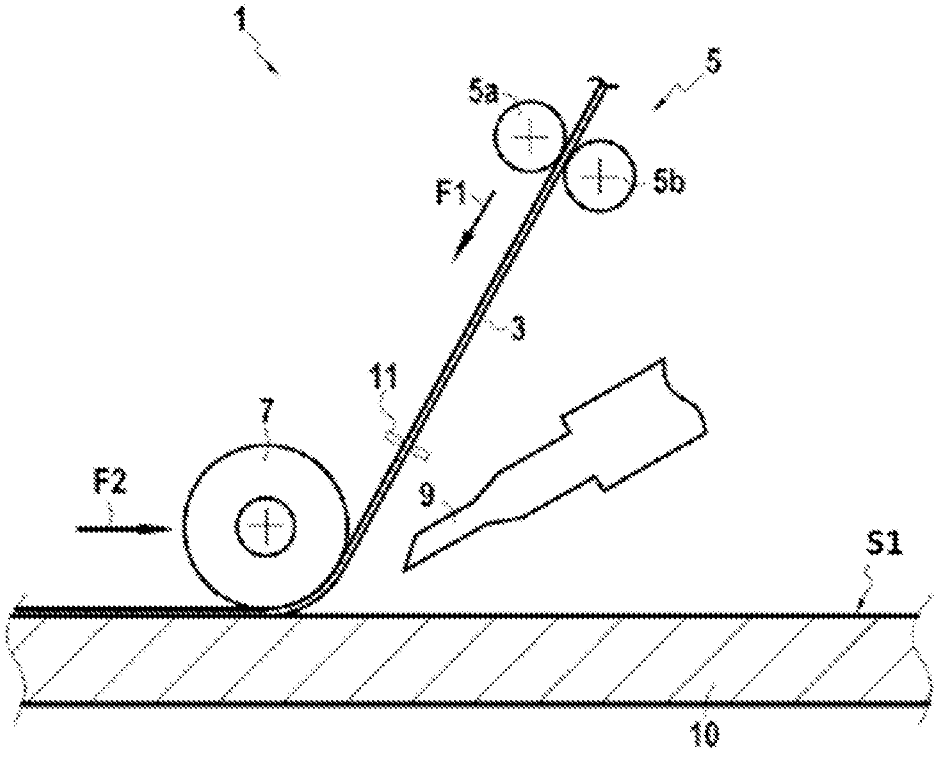
[Fig. 2]
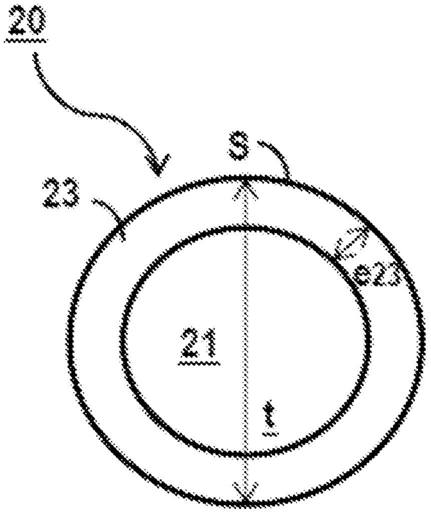

[Fig. 3]
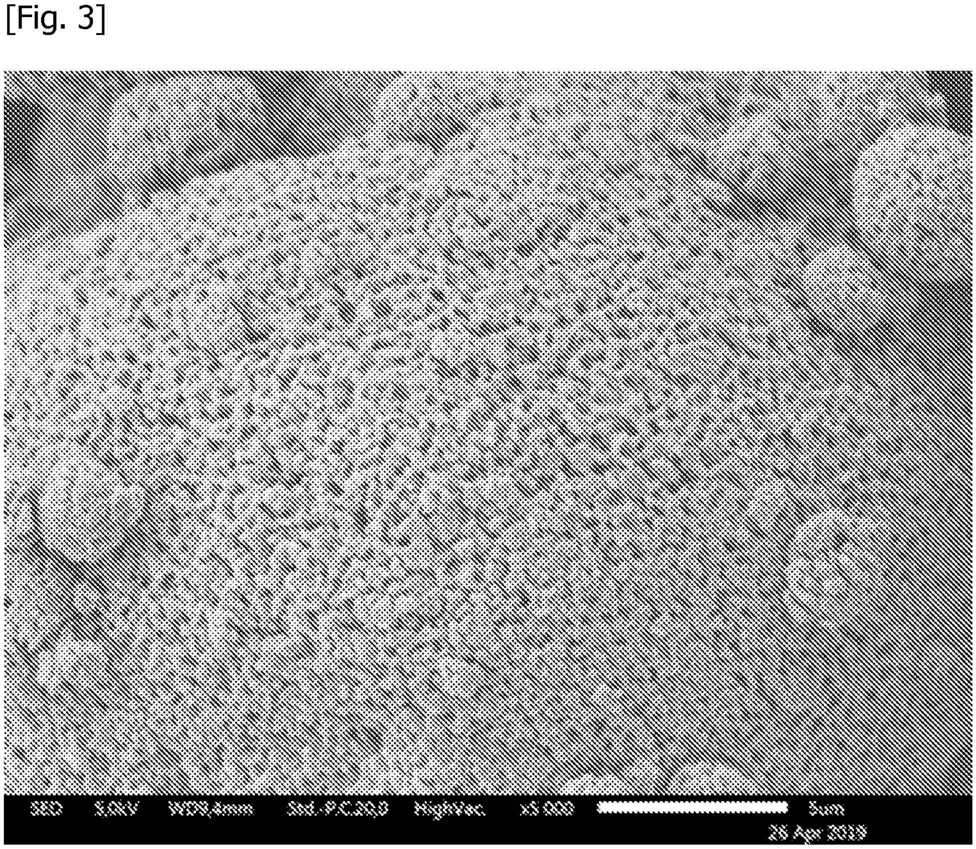
[Fig. 4]
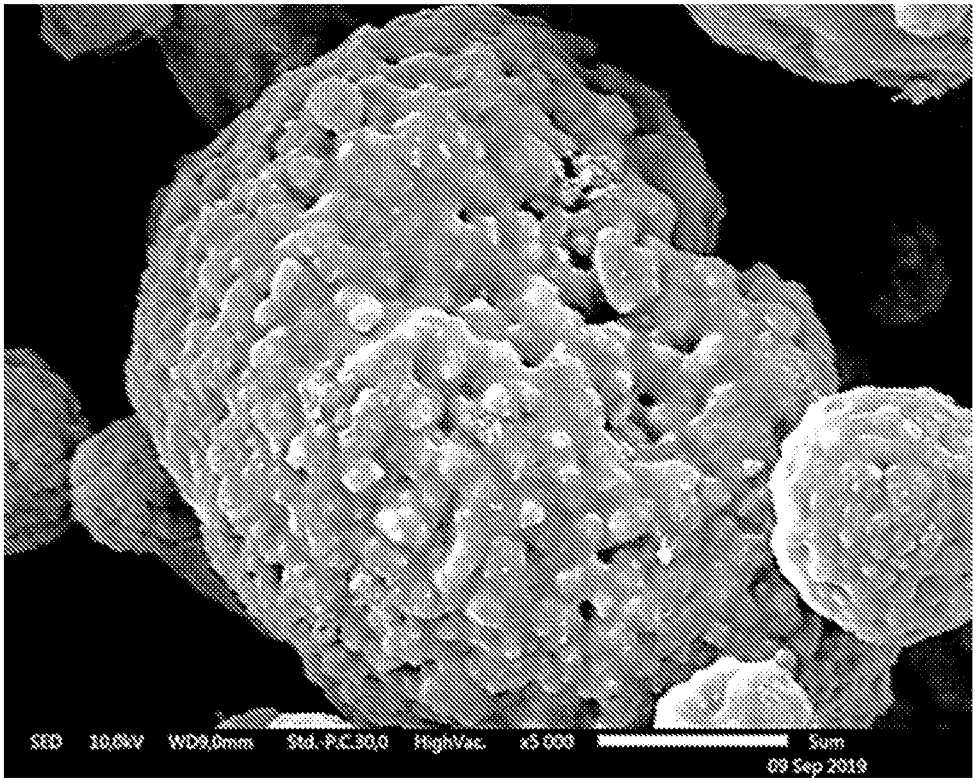

METHOD FOR PRODUCING A CERAMIC MATRIX COMPOSITE PART

CROSS-REFERENCE TO RELATED APPLICATIONS

This application is the U.S. National Stage of PCT/FR2021/051996, filed Nov. 10, 2021, which in turn claims priority to French patent application number 2012178 filed Nov. 26, 2020. The content of these applications are incorporated herein by reference in their entireties.

TECHNICAL FIELD

The invention concerns a method for producing a part made of ceramic matrix composite material ('CMC material'), in which fibrous structures filled with ceramic cores coated with an adhesive are used to form the fiber preform, these cores being then sintered to obtain the ceramic matrix.

PRIOR ART

It is desirable to have new methods available for manufacturing ceramic matrix parts which are simple to implement and which make it possible, in particular, to dispense with an additional step of introducing the matrix into the formed fiber preform.

DISCLOSURE OF THE INVENTION

The invention concerns a method for producing a part made of a ceramic matrix composite material, comprising:

forming a fiber preform from a plurality of fibrous structures comprising particles, said particles comprising a core of ceramic material coated with an adhesive, and sintering said particles in the resulting fiber preform to form the ceramic matrix in the porosity thereof.

A particle is a cohesive ceramic entity that can consist of one or more crystallites.

The invention uses fibrous structures filled with ceramic cores coated with an adhesive. The adhesive fixes the ceramic particles to the fibers of the fibrous structures and confers good cohesion to the fibrous structures among themselves to form the fiber preform. The adhesive is used as a binder in the formation of the fiber preform and is then removed during the sintering heat treatment of the ceramic material of the particles to form the matrix. The invention makes it possible to dispense with an additional step of introducing the matrix after forming the preform, thus simplifying the manufacture of the CMC material part, in particular by making it possible to produce more complex shapes.

In one example of embodiment, the particles are obtained before forming the preform by hot compression of granules formed of a cohesive assembly comprising the ceramic material cores and the adhesive so as to fragment the granules into particles.

The granules may be free of solvent and may or may not have porosity, distributed homogeneously or heterogeneously within the granules. The granules are not necessarily obtained by a granulation process. The granules are destroyed by the application of a thermomechanical stress, making it possible, for example, to activate the adhesive, so as to form the particles.

The hot compression leading to the fragmentation of the granules into particles may be performed by calendering.

The hot compression may be performed on a fiber tape comprising the granules, and the fiber tape may then be cut to form the fibrous structures comprising the particles that form the fiber preform.

As a variant, the hot compression may be carried out directly on the fibrous structures comprising the granules before proceeding with the formation of the fiber preform from these fibrous structures.

In one embodiment, the mean size of the granules is less than or equal to 10 times the mean diameter of the fibers forming the fibrous structures.

Unless otherwise specified, a mean dimension is understood as the D50 dimension, i.e., the statistical granule size at half the population.

The fact of using granules having a limited size allows a core filling of the fibrous structures and consequently improves the homogeneity of the matrix formed. In particular, the mean size of the granules may be less than or equal to 5 times, for example less than or equal to 2 times, the mean diameter of the fibers forming the fibrous structures. In particular, this mean size may be comprised between 0.1 times and 10 times, for example between 0.1 times and 5 times, or even between 0.1 times and 2 times, the mean diameter of the fibers forming the fibrous structures.

In one example of embodiment, the granules are obtained from a suspension comprising a mixture of the cores made of ceramic material with a liquid medium comprising the constituent or constituents of the adhesive, a dispersant and, optionally, a surfactant. The ceramic cores may be intimately mixed on a submicron scale with the constituent(s) of the adhesive, i.e., to form a homogeneous mixture on a submicron scale with this constituent or these constituents.

Various techniques suitable for the formation of granules from a suspension are known in and of themselves and discussed below. The use of a dispersant in the liquid medium makes it possible to reduce (i) the risk of formation of agglomerates of ceramic cores, which results in further improvement of the homogeneity of the matrix formed after sintering, and (ii) the viscosity of the suspension, which results in smaller granules. The use of a surfactant in the liquid medium makes it possible to reduce the surface tension of the suspension and thus to further reduce the size of the granules.

In one embodiment, the adhesive is soluble and/or dispersible in water.

As will be detailed below, the choice of such an adhesive advantageously makes it possible to use water as solvent or dispersing medium during the formation of the granules, which simplifies the process for obtaining these granules.

In one embodiment, the adhesive comprises at least one thermoplastic polymer and/or a tackifying resin. The adhesive may comprise a thermoplastic polymer.

The use of a thermoplastic adhesive is advantageous insofar as its adhesion capacity can be modulated by heating during the formation of the fiber preform. This heating can result in softening or even melting of the adhesive. Moreover, this modulation is reversible once the thermoplastic adhesive has cooled.

The thermoplastic polymer may be chosen from: polyethylene glycol (PEG), polyethyloxazoline (PEOx), polyvinyl alcohol (PVOH), polyvinylpyrrolidone (PVP), poly(vinylpyrrolidone-co-vinylacetate) (PVPVAc), polyvinyl methyl ether (PVME), polyvinyl acetate (PVAc), polyvinyl acetal, a phenoxy resin and mixtures thereof.

In particular, the thermoplastic polymer may have a molar mass comprised between 1 kg/mol and 500 kg/mol.

Such a characteristic is advantageous because this molar mass is sufficient to confer a high adhesion power to the adhesive while being sufficiently limited to guarantee the formation of fine granules during their preparation and sufficient creep during the hot compression step if it is done.

In one example of embodiment, the adhesive comprises a tackifying resin, for example chosen from: rosin esters (for example Aquatac FC-8560 from the company Kraton, Deterline G2L from the company DRT, Sylvatac 95 from the company Kraton or Dymerex from the company Eastman) or phenolic terpenes (for example Dermulsene TR 602 from the company DRT), and mixtures thereof.

The adhesive may also comprise a plasticizer, for example chosen from glycerol, polyethylene glycols of low molar mass, generally of molar mass less than or equal to 4000 g/mol, phthalates, such as dibutyl phthalate or benzyl butyl phthalate, and fatty acids (for example, Emersol 871 from Emery), and mixtures thereof.

In one example of embodiment, the fiber preform is formed by automated fiber placement.

This technique of automated fiber placement is hereinafter referred to as 'AFP'. This mechanized technique is of interest in reducing the cost of production of composite material parts compared with manual draping by an operator. Moreover, this technique optimizes the topology of the fibrous reinforcement and provides access to optimal fiber arrangements for the desired application. However, the invention is not limited to such a technique, since it would not be outside the scope of the invention if the fibrous structures were draped manually on a form in order to obtain the fiber preform.

In one embodiment, the fibrous structures are fibrous rovings. However, the invention is not limited to such an example, the latter also being applicable when the fibrous structures are woven or non-woven fibrous plies, for example.

In one example of embodiment, the fibrous structures are formed of oxide or non-oxide ceramic fibers, or carbon fibers, or a mixture of such fibers.

The cores can be made of oxide ceramic material, such as alumina, or non-oxide ceramic material, such as silicon carbide. In the case where the core is an oxide ceramic material, the fibrous structures may also be formed of oxide ceramic fibers, such as alumina or aluminosilicate fibers or a mixture of such fibers. In the case where the core is a non-oxide ceramic material, the fibrous structures may be formed of carbon fibers or non-oxide ceramic fibers, or a mixture of such fibers. According to one example, the composite material part obtained may be an oxide-oxide composite.

The part obtained may be a part of a turbomachine, for example an aeronautical turbomachine. The part can be a turbomachine afterbody part. In a variant, the part may be a turbine part or a thermal protection part.

BRIEF DESCRIPTION OF DRAWINGS

FIG. 1 schematically and partially illustrates the formation of a fiber preform by automated fiber placement in the context of an example of a process according to the invention.

FIG. 2 schematically illustrates a particle comprising a ceramic core coated with adhesive which can be used in the context of the invention.

FIG. 3 is a photograph of granules that can be used in the context of the invention.

FIG. 4 is a photograph of other granules which can be used in the context of the invention.

DESCRIPTION OF THE EMBODIMENTS

In the following, for the sake of conciseness, the particles comprising the ceramic core coated by the adhesive will be designated by 'particles'.

FIG. 1 schematically and partially illustrates the production of a fiber preform by AFP technique in the context of an example method according to the invention. The fiber preform is intended to constitute the fibrous reinforcement of the part to be obtained.

FIG. 1 schematically illustrates the structure of a deposition head 1 of a device for implementing an AFP technique. The structure of the deposition head 1 illustrated is known in and of itself. The deposition head 1 is fed by a fiber tape 3 in which the particles are present in order to produce the fiber preform.

The fiber preform is formed on the surface S1 of a support 10. For this, the deposition head 1 is fed by the tape 3 comprising the particles. The tape 3 is conveyed by a conveyor element 5 to a pressure application element 7 on the surface S1 side. The conveyor element 5 is here in the form of a pair of counter-rotating rollers 5*a* and 5*b* between which the tape 3 is present. The conveyor element 5 makes it possible to advance the tape 3 as far as the pressure application element 7 in the direction represented by the arrow F1.

The pressure application element 7 applies pressure to the tape 3 in order to deposit it on the surface S1. The pressure application element 7 is here in the form of a roller. The deposition head 1 may also comprise a heating element 9 situated in the vicinity of the pressure application element 7. In the case of a thermoplastic adhesive, the heating element 9 can soften the adhesive during the formation of the fiber preform and thus modulate the adhesive capacity during the formation of the preform.

During deposition, the deposition head 1 is movable in order to apply the tape 3 to a first determined area of the surface S1 (arrow F2). Once the application has been carried out on the first area, the cutting element 11 of the deposition head 1 cuts the tape 3. After this cutting, a first fibrous structure, formed by a first section of the tape 3, is thus deposited on the first area of the surface S1.

The formation of the preform is then continued by advancing the tape 3 in the deposition head 1 as far as the pressure application element 7 by actuating the conveyor element 5. The deposition head 1 can be moved in order to deposit the tape 3 on a second area of the surface S1 which is distinct from the first area. The deposition of a second fibrous structure, formed by a second section of the tape 3, on the second area of the surface S1 is then obtained in a manner similar to that described above.

Production of the preform is then continued by depositing one or more other fibrous structures comprising the particles in the same way as described above.

As mentioned above, the fibrous structures may be formed of ceramic and/or carbon fibers. The ceramic fibers may be fibers made of a non-oxide material, such as silicon carbide SIC, or of an oxide material, such as alumina. In one example of embodiment, the fibers used may be SiC fibers supplied under the name 'Nicalon', 'Hi-Nicalon' or 'Hi-Nicalon-S' by the Japanese company Nippon Carbon or 'Tyranno SA3', by the company UBE. It is also possible to use alumina fibers supplied under the name 'Nextel' by the company 3M. The fibers supplied under the name Torayca T300 by the company Toray are one example of carbon fibers which can be used.

The deposited fibrous structures may be in the form of fiber rovings, i.e., fiber bundles, or fabric plies. Fibrous structures may be dry during the formation of the fiber preform (i.e., they are not impregnated with a liquid phase). The fibrous structures are filled with the particles. The particles are present in the porosity of the fibrous structures. The mass content of particles in the fibrous structures may be greater than or equal to 20%, for example, greater than or equal to 25%, or even greater than or equal to 30%. This mass content may be between 20% and 60%, for example between 25% and 50%.

The particles 20 comprise a core 21 of ceramic material individually coated with a layer of adhesive 23. The particles 20 are 'core-shell' particles comprising a core portion formed by the ceramic material core 21 and a shell formed by the adhesive layer 23. The adhesive 23 is in contact with the core 21. The adhesive 23 defines the outer surface S of the particles. The adhesive 23 completely coats the ceramic core 21. The ceramic material core 21 may, for example, be made of an oxide ceramic material, such as alumina, silica or mullite, or of a non-oxide ceramic material, such as a carbide, a boride or a nitride, for example silicon carbide. The mean thickness $e_{23}$ of the adhesive layer 23 may be greater than or equal to 0.05 μm, for example, 0.1 μm and, for example, comprised between 0.1 μm and 5 μm. The particles can verify a ratio [mean thickness $e_{23}$ of the adhesive layer]/[mean size t of the particles 20] greater than or equal to 0.1%, for example, comprised between 1% and 10%. The particles 20 can verify a ratio between the volume of the adhesive layer 23 and the volume of the core 21 comprised between 0.1 and 1, for example comprised between 0.25 and 0.85.

The adhesive may be a thermoplastic polymer (for example, polyvinyl acetate, polyvinyl alcohol, polyvinyl acetal or phenoxy resin), a thermosetting polymer (for example, polyether, epoxy or melamine formaldehyde) or an elastomer (for example, natural rubber, butyl, styrene butadiene or silicone resin). The adhesive can be a hot melt adhesive. The adhesive may have a melting or softening temperature less than or equal to 250° C. The use of a thermoplastic adhesive is preferred because it can change state reversibly.

It should also be noted that, depending on the properties desired for the part to be obtained, the fibers of the fiber tape 3 may have been coated with a coating of ceramic or carbon material before the granules are introduced.

Thus, these fibers can be coated with an interphase. The interphase can be monolayer or multilayer. The interphase may comprise at least one layer of pyrolytic carbon (PyC), boron nitride (BN), silicon-doped boron nitride (BN(Si), with silicon in a mass proportion comprised between 5% and 40%, the balance being boron nitride) or boron-doped carbon (BC, with boron in an atomic proportion comprised between 5% and 20%, the balance being carbon). The thickness of the interphase may be comprised, for example, between 10 nm and 1000 nm, and, for example, between 10 nm and 100 nm. The interphase here has a defragmentation function in the part obtained which favors the deviation of any cracks reaching the interphase after propagating in the matrix, preventing or delaying the breaking of fibers by such cracks. The interphase can optionally be coated with an additional layer of silicon carbide which makes it possible, in particular, to improve the oxidation resistance of the part obtained. The techniques for forming the interphase and the SIC layer are known in and of themselves and do not need to be further detailed here. For example, it is possible to use a chemical vapor deposition/infiltration technique ('CVD'/'CVI') to produce such coatings.

The preform obtained may comprise a single fibrous layer or alternatively a plurality of stacked fibrous layers. Forming the preform may, for example, include depositing a first fibrous layer comprising a first set of fibrous structures filled with particles. The formation of the preform may further include depositing a second fibrous layer on the first layer, the second layer comprising a second set of fibrous structures filled with particles. The fibers of the first set may extend in the same first direction (i.e. parallel to each other). Similarly, the fibers of the second set may extend in the same second direction. The second direction may be parallel to the first direction. As a variant, the second direction forms a non-zero angle with the first direction. The angle formed between the first and second directions depends on the desired mechanical properties of the part to be obtained. According to one variant, the fiber preform comprises a single fiber layer.

The surface S1 on which the fibrous structures comprising the particles are deposited may be planar. As a variant, the surface S1 may be non-planar and may be convex or concave. The surface S1 may, for example, have a developable shape, such as a conical, frustoconical or cylindrical shape, or a non-developable shape. During the deposition of the structures by the AFP technique, the surface S1 may be fixed or, in a variant, be mobile. In the latter case, the surface S1 may for example be driven by a rotational movement during deposition.

Once the preform has been obtained, a heat treatment is carried out which makes it possible to perform partial or complete sintering of the particles. The rise in temperature during this heat treatment allows eliminating the adhesive. The temperature imposed during sintering may be greater than or equal to 1000° C., for example greater than or equal to 1100° C. The conditions imposed during sintering depend on the ceramic material forming the particle core. The matrix formed coats and binds the fibers of the fiber preform to obtain the CMC material part. The matrix may occupy the majority (i.e., more than 50%) of the volume of the initial porosity of the fiber preform. In particular, the matrix may occupy more than 75%, or even substantially all, of the volume of this initial porosity.

Various steps of one example of a method according to the invention have just been described. The following details the aspect relating to the manufacture of granules consisting of a mixture of ceramic cores and adhesive.

The granules are produced before forming the preform by using a technique chosen from: fluidized bed, atomization, freeze granulation, evaporation under reduced pressure or encapsulation by emulsion polymerization. These processes are known in and of themselves and the invention is not limited to the implementation of a particular process for the formation of granules. Preferably, the granules are produced by spraying, for example by atomization, or freeze granulation. These processes are advantageous because they have a limited implementation cost.

The granules can be produced from a suspension comprising the ceramic material in powder form in a liquid medium which comprises the adhesive. The adhesive can be dissolved in the liquid medium. As a variant, the adhesive may be dispersed in the form of micelles in the liquid medium; in the latter case the liquid medium further comprises a surfactant. The liquid medium can be water. Water use is preferred for environmental, safety and cost reasons.

As a variant, it is possible to use an organic liquid medium capable of dissolving the adhesive, for example an alcohol such as ethanol, methanol, isopropanol or mixtures thereof, a $C_5$ to $C_{12}$ alkane, an aromatic or non-aromatic cyclic compound such as cyclohexane, benzene or mixtures thereof, or a ketone such as acetone, butanone or mixtures thereof. It is also possible to use a liquid medium formed of a mixture of water and an organic compound.

Controlling the viscosity of the suspension used makes it possible to control the size of the granules obtained by the spraying processes. Indeed, the lower the viscosity of the suspension, the smaller the size of the granules obtained.

In order to reduce the viscosity and to promote a small granule size, the liquid medium may also comprise a dispersant. A dispersant is a molecule that has an affinity with the surface of the ceramic cores in such a way that it adsorbs on the surface of the said ceramic cores. The dispersant must also either have a positive or negative electrical charge, or be a long molecule having a certain steric hindrance, or both. Preferably, in an aqueous medium and with oxide-type ceramics, the dispersant is an ammonium polymethacrylate. This compound has an electrosteric effect because of the charge of these $COO^-$ carboxyl groups and because of its high molar mass. Other examples of dispersants are possible, such as polycarboxylic acids and their salts, phosphates, sulphates and sulphonates. The dispersant content in the suspension may be greater than or equal to 0.05 mg/m$^2$, for example between 0.05 mg/m$^2$ and 10 mg/m$^2$. This content is expressed with respect to the total surface area of the ceramic cores in suspension.

The volume content of the cores of ceramic material in the suspension may be greater than or equal to 6%, for example comprised between 10% and 50%. The volume content of adhesive may be greater than or equal to 10%, for example comprised between 10% and 50%, this content being taken with regard to the volume of the cores of ceramic material in suspension.

It is thus possible, for example, to obtain the granules by a spraying technique from a suspension as described above.

By way of example, FIG. 3 shows granules obtained by atomization from a first suspension containing 20 vol % of alumina and 2.0 vol % of polyethylene glycol with a molar mass of 35 kg/mol, 2.5 vol % of polyethyloxazoline with a molar mass of 50 kg/mol and a polyethylene glycol with a molar mass of 300 g/mol.

By way of example, FIG. 4 shows granules obtained by atomization from a second suspension containing 11 vol % of alumina and 7.3 vol % of polyethyloxazoline with a molar mass equal to 200 kg/mol.

Table 1 below gives examples of suspension formulations allowing the production of granules consisting of an intimate mixture of cores and adhesive which can be used in the context of the invention.

TABLE 1

| | A | B | C |
|---|---|---|---|
| Alumina | 48.7% | 32.7% | 49.1% |
| Ammonium polymethacrylate 16 kg/mol | 0.2% | 0.1% | 0.1% |
| Siloxane | 0.004% | 0.004% | |
| Polyethylene glycol 0.3 kg/mol | 0.3% | | |
| Polyethylene glycol 35 kg/mol | 1.5% | | |
| Polyethyloxazoline 50 kg/mol | 1.8% | | |
| Polyethyloxazoline 200 kg/mol | | 6.3% | |
| Rosin ester | | | 11.0% |
| Water | 47.6% | 60.9% | 39.8% |

TABLE 1-continued

| | A | B | C |
|---|---|---|---|
| Viscosity (mPa · s) | 19 | 56 | 15 |
| Surface tension (N/m) | 30 | 30 | 32 |
| d50 of granules (μm) | 14 | 19 | 16 |

Formulation A uses two thermoplastics (polyethyloxazoline and polyethylene glycol) of intermediate molar masses and a low molar mass polyethylene glycol (300 g/mol) as plasticizer at low concentrations, producing small granules by means of an atomizer using a 1.4 mm spray nozzle. This example makes it possible, for example, to obtain granules of the order of the diameter of the fibers in the case of alumina rovings formed by 'Nextel 610' reference fibers.

Formulation B uses an adhesive consisting solely of a thermoplastic, thus providing a high adhesion power in return for a lower flexibility.

Formulation C uses an adhesive consisting solely of a tackifying resin (rosin ester) which makes it possible to obtain a high fluidity during impregnation in the roving, but which has a lower adhesion power.

Once obtained, the granules are introduced into the fibrous structures or the tape mentioned above. For this purpose, a dry impregnation technique can be used, such as powder bed impregnation, fluidized or not, by dusting or by electrostatic spraying (electrostatic gun). Once the granules have been introduced, their cohesion is destroyed by the application of a thermomechanical stress during a hot compression step, for example using a calender, in order to form the particles formed of the core coated with adhesive described above. The temperature imposed during hot compression may be greater than or equal to 50° C., for example comprised between 80° C. and 250° C. The pressure imposed during hot compression may be greater than or equal to 10 MPa, for example comprised between 15 MPa and 200 MPa. In the case where the granules are introduced into the tape, the tape comprises the same fibers as in the fibrous structures and is cut after hot compression to form the fibrous structures comprising the particles which are deposited to the desired shape in order to form the preform.

The expression "comprised between . . . and . . . " should be understood to include the bounds.

The invention claimed is:

1. A method for producing a ceramic matrix composite part, comprising:

forming a fiber preform from a plurality of fibrous structures comprising core-shell particles, said core-shell particles comprising a core portion formed by a core of ceramic material and a shell formed by an adhesive layer, the adhesive defining an outer surface of the core-shell particles and completely coating the core of ceramic material, and sintering said core-shell particles in the fiber preform obtained in order to form the ceramic matrix in a porosity of the fiber preform.

2. The method according to claim 1, wherein the method further comprising obtaining particles, before forming the preform, by hot compression of granules formed of a cohesive assembly comprising the ceramic material cores and the adhesive so as to fragment the granules into the core-shell particles.

3. The method according to claim 2, wherein a mean granule size is less than or equal to 10 times a mean diameter of the fibers forming the fibrous structures, the hot compression being carried out on a fiber tape comprising the granules and the process then comprising cutting the fiber tape so as to form the fibrous structures which make it possible to form the fiber preform, or the hot compression being carried out directly on the fibrous structures comprising the granules before proceeding with the formation of the fiber preform.

4. The method according to claim 3, wherein the mean size of the granules is less than or equal to 5 times the mean diameter of the fibers forming the fibrous structures.

5. The method according to claim 2, the method further comprising obtaining the granules from a suspension comprising a mixture of the cores made of ceramic material with a liquid medium comprising constituent or constituents of the adhesive, a dispersant and, optionally, a surfactant.

6. The method according to claim 1, wherein the adhesive is soluble or dispersible in water.

7. The method according to claim 1, wherein the adhesive comprises a thermoplastic polymer.

8. The method according to claim 7, wherein the thermoplastic polymer is chosen from: polyethylene glycol (PEG), polyethyloxazoline (PEOx), polyvinyl alcohol (PVOH), polyvinylpyrrolidone (PVP), poly-(vinylpyrrolidone-co-vinylacetate) (PVPVAc), polyvinyl methyl ether (PVME), polyvinyl acetate (PVAc), polyvinyl acetal, a phenoxy resin and mixtures thereof.

9. The method according to claim 7, wherein the thermoplastic polymer has molar mass comprised between 1 kg/mol and 500 kg/mol.

10. The method according to claim 1, wherein the adhesive comprises a tackifying resin.

11. The method according to claim 1, wherein the adhesive further comprises a plasticizer.

12. The method according to claim 1, wherein the fiber preform is formed by automated fiber placement.

13. The method according to claim 1, wherein the fibrous structures are fiber rovings.

14. The method according to claim 10, wherein the tackifying resin is selected from: rosin esters or phenolic terpenes, and mixtures thereof.

15. The method according to claim 11, wherein the plasticizer is selected from: glycerol, polyethylene glycols of molar mass less than or equal to 4000 g/mol, phthalates, fatty acids, and mixtures thereof.

16. The method according to claim 1, wherein the fibrous structures are dry during the formation of the fiber preform such that the fibrous structures are not impregnated with a liquid phase during said forming.

17. The method according to claim 1, wherein the adhesive is removed during said sintering.

* * * * *